(12) United States Patent
Binnig et al.

(10) Patent No.: US 7,054,257 B2
(45) Date of Patent: May 30, 2006

(54) AFM-BASED DATA STORAGE AND MICROSCOPY

(75) Inventors: Gerd K. Binnig, Wollerau (CH); Michel Despont, Aldwisil (CH); Peter Vettiger, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/426,064

(22) Filed: Apr. 29, 2003

(65) Prior Publication Data

US 2004/0218507 A1    Nov. 4, 2004

(51) Int. Cl.
*G11B 7/00* (2006.01)
*H01J 37/00* (2006.01)

(52) U.S. Cl. .............. 369/126; 369/127; 250/306
(58) Field of Classification Search ............... 369/126, 369/127, 13.01, 44.28, 154, 13.14, 13.56, 369/101; 977/DIG. 1; 250/306; 374/11, 374/43, 124, 164, 178; 360/59; 702/33

See application file for complete search history.

(56) References Cited

U.S. PATENT DOCUMENTS

| | | | | |
|---|---|---|---|---|
| 5,196,701 A | * | 3/1993 | Foster et al. | 250/306 |
| 5,289,004 A | * | 2/1994 | Okada et al. | 250/306 |
| 5,713,667 A | * | 2/1998 | Alvis et al. | 374/178 |
| 5,856,967 A | * | 1/1999 | Mamin et al. | 369/126 |
| 5,929,438 A | * | 7/1999 | Suzuki et al. | 250/306 |
| 6,095,679 A | * | 8/2000 | Hammiche et al. | 374/43 |
| 6,233,206 B1 | * | 5/2001 | Hamann et al. | 369/13.01 |
| 6,433,310 B1 | * | 8/2002 | Wickramasinghe et al. | 369/127 |
| 6,665,258 B1 | * | 12/2003 | Dietzel et al. | 369/126 |
| 6,667,467 B1 | * | 12/2003 | Shimizu et al. | 250/306 |

* cited by examiner

*Primary Examiner*—William Korzuch
*Assistant Examiner*—Kim-Kwok Chu
(74) *Attorney, Agent, or Firm*—Richard M. Goldman

(57) ABSTRACT

Read/write components for AFM-based data storage devices are provided. In particular embodiments, a read/write component comprises lever means and a support structure, the lever means being connected to the support structure for substantially pivotal movement. The lever means provides first and second current paths between a pair of electrical supply lines on the support structure via which the lever means can be connected in use to power supply means operable in a write mode and a read mode. A write-mode heater is provided on the lever means in the first current path, and a read/write tip is provided on the write-mode heater. A read-mode heater is provided on the lever means in the second current path. Decoupling means is arranged to inhibit current flow to the write-mode heater via the first current path in use when the power supply means is operated in the read mode. The component, with separate write and read-mode heaters, can thus be addressed in both the write and read modes via a single pair of supply lines. Other embodiments provide read/write components employing a thermal decoupling mechanism, and read/write components where read-sensing is performed by a proximity sensing arrangement between the lever means and the support structure. Sensing apparatus for atomic force microscopes is also provided where tip movement can be detected via similar proximity sensing arrangements.

35 Claims, 8 Drawing Sheets

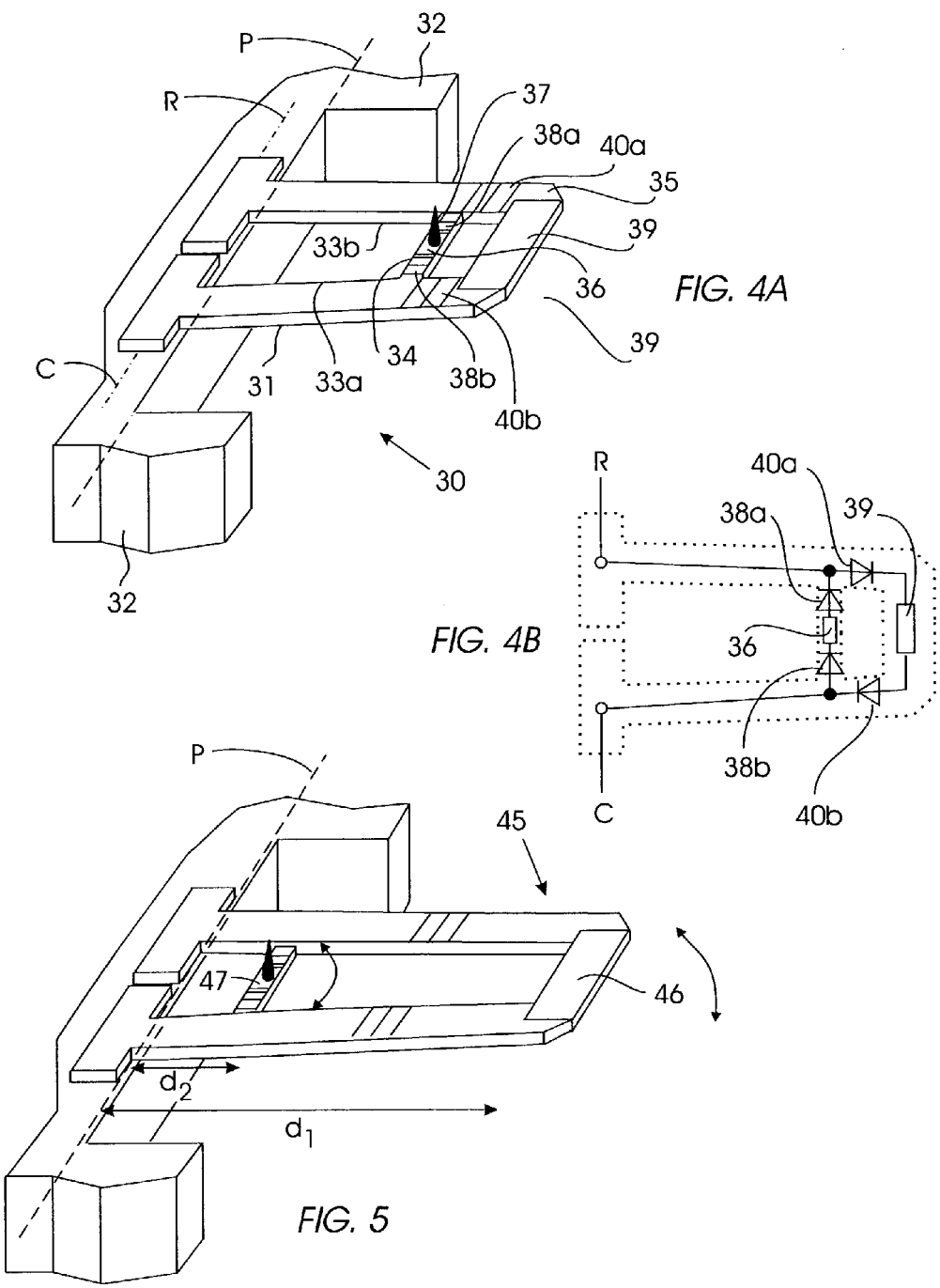

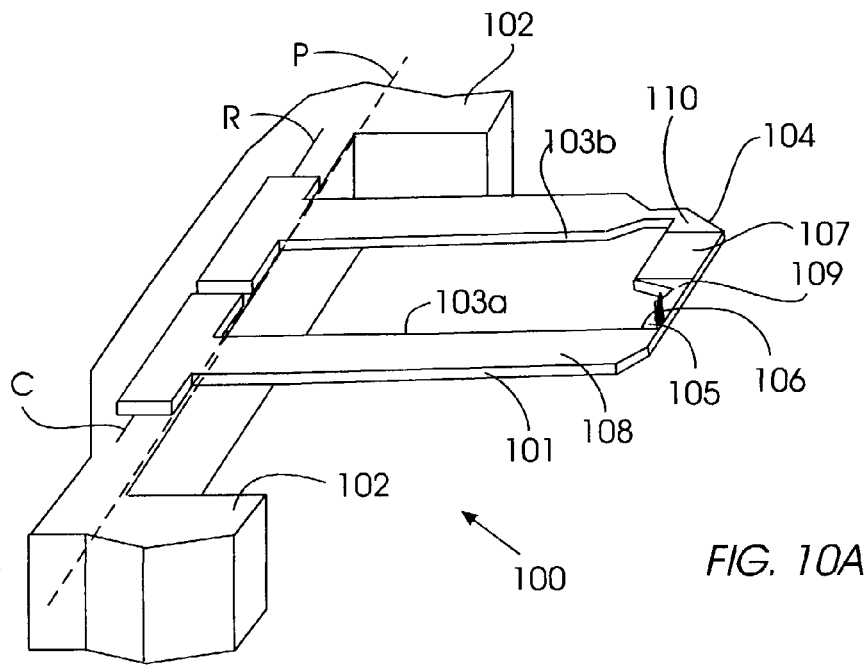
FIG. 10A
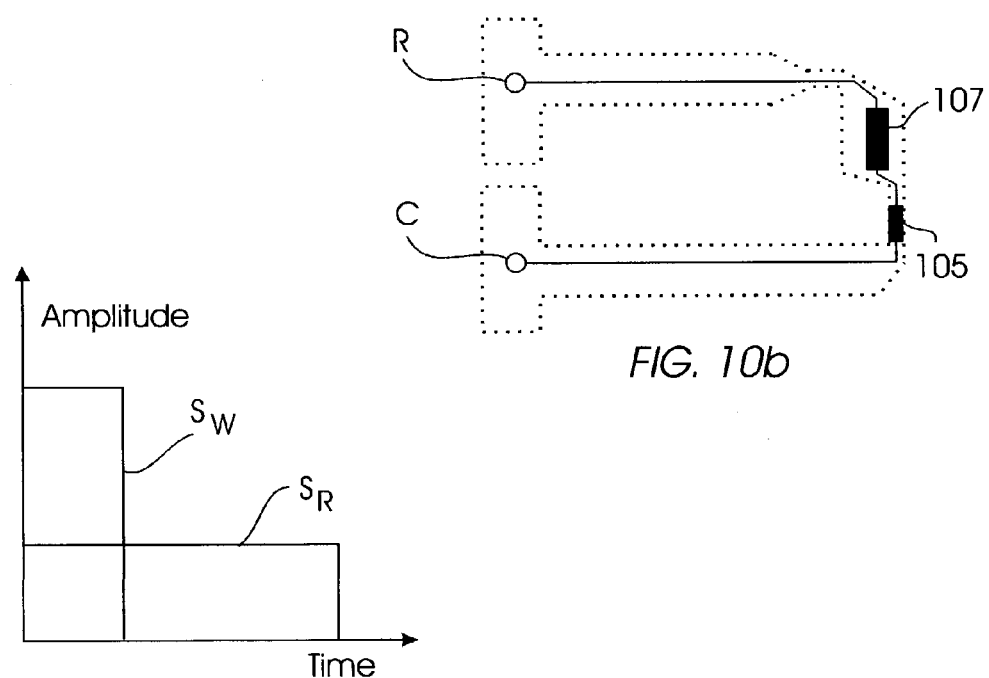
FIG. 10b
FIG. 10c

AFM-BASED DATA STORAGE AND MICROSCOPY

FIELD OF THE INVENTION

This invention relates generally to AFM(Atomic Force Microscope)-based data storage and microscopy systems. Particular embodiments of the invention provide read/write apparatus for use in data storage devices and sensing apparatus for use in atomic force microscopes.

BACKGROUND OF THE INVENTION

The atomic force microscope is a now well-known device in which the topography of a sample is sensed by a tip mounted on the end of a microfabricated cantilever. As the sample is scanned, the interaction of atomic forces between the nanometer-sharp tip and the sample surface causes pivotal deflection of the cantilever. The sample topography is determined by detecting this deflection. The AFM technology has also been applied to the field of data storage with a view to providing a new generation of high-density, high data-rate data storage devices for mass-memory applications. AFM-based data storage is described in detail in IBM Journal of Research & Development, Volume 44, No. 3, May 2000, pp323–340, "The 'Millipede'—More Than One Thousand Tips for Future AFM Data Storage", Vettiger et al., and the references cited therein. Here, the cantilever-mounted tip is used for reading and writing of data on the surface of a data storage medium. The basic principles of the cantilever design and the read and write operations are summarized briefly below.

SUMMARY OF THE INVENTION

According to a first aspect of the present invention there is provided a read/write component for a data storage device, the read/write component comprising:

lever means and a support structure, the lever means being connected to the support structure for substantially pivotal movement and providing first and second current paths between a pair of electrical supply lines on the support structure via which the lever means is connectable, in use, to power supply means operable in a write mode and a read mode;

a write-mode heater provided on the lever means in the first current path;

a read/write tip provided on the write-mode heater;

a read-mode heater provided on the lever means in the second current path; and decoupling means arranged to inhibit current flow to the write-mode heater via the first current path in use when the power supply means is operated in the read mode.

In embodiments of the present invention, therefore, separate write and read-mode heaters are provided on the lever means in respective current paths between the supply lines on the support structure, and decoupling means inhibits current flow via the current path to the write-mode heater when the component is operated in the read mode. The use of separate read and write heaters, together with the decoupling of the write heater in the read mode of operation, allows the design of the write and read heaters to be tailored more closely to the needs of the write and read-mode operations while still requiring only a single pair of supply lines to address the component in the two modes. For example, the write heater can be made small, with a low resistance, to provide a fast, low-voltage, low power writing element. In contrast, the read heater can be made large to increase the thermal sensitivity and signal-to-noise ratio in the read mode, while the decoupling means operates here to inhibit current flow to, and hence heating of, the write heater, thus preventing this heater from reaching a writing temperature. The efficiency of the component, for example in terms of writing speed, power consumption and reading sensitivity, can thus be significantly improved without requiring additional supply lines for the dual-mode operation, allowing convenient implementation of a simple x-y addressed array arrangement as discussed above.

In embodiments where the decoupling means serves only to inhibit current flow to the write heater in the read mode, then in the write mode some heating of the read heater will occur during heating of the write heater to $T_W$. While this energy loss may not be critical, in preferred embodiments the decoupling means is arranged additionally to inhibit current flow to the read-mode heater via the second current path in use when the power supply means is operated in the write mode. In such embodiments, the read and write heaters are effectively independently addressable, allowing the maximum performance benefits to be gained from read and write heater optimization.

Arrangements can be envisaged where the decoupling means comprises some form of supply-controlled switch for switching between the two current paths according to the operating mode. For simplicity however, in preferred embodiments the decoupling means comprises write decoupling means, which inhibits current flow to the write-mode heater when the power supply means is operated in the read mode, and read decoupling means which inhibits current flow to the read-mode heater when the power supply means is operated in the write mode. As discussed further below, the location of the decoupling means on the component depends on the particular design of the lever means.

The lever means may be configured as a cantilever, and while embodiments can be envisaged in which the current paths are provided as conductive tracks on the cantilever body, the cantilever is conveniently formed as a conductive structure which defines the current paths generally by virtue of its shape. In one example, the cantilever comprises two laterally disposed leg portions, connected at respective corresponding ends to the support structure, and first and second bridging portions each interconnecting the two leg portions. Here, the first bridging portion comprises the write-mode heater and the second bridging portion comprises the read-mode heater. In this example, the leg portions and the first bridging portion may themselves define the first current path, the second current path being similarly defined by the leg portions and the second bridging portion. Such an embodiment will be described in more detail below, and in this case the decoupling means is located on the cantilever. In another example, the cantilever comprises three laterally disposed leg portions, connected at respective corresponding ends to the support structure, a first bridging portion interconnecting the central leg portion to a first of the outer leg portions and a second bridging portion interconnecting the central leg portion to the second outer leg portion. Again, the first bridging portion comprises the write-mode heater and the second bridging portion comprises the read-mode heater. In this case, however, the first outer leg portion, the first bridging portion and the central leg portion define the first current path, and the second outer leg portion, the second bridging portion and the central leg portion define the second current path. With this construction, the decoupling means can be conveniently located on he support structure as will be demonstrated below.

In an alternative arrangement, rather than being configured as a cantilever as in the prior proposals, the lever means comprises an elongate lever body and two connection arms, extending outwardly from the lever body on either side thereof, connecting the lever body to the support structure and defining a pivot axis, offset from the ends of the lever body, about which the lever body pivots in use. In this "swing lever" arrangement, the write-mode heater and read-mode heater are disposed on opposite sides of the pivot axis at or near the ends of the lever body. Again, the lever body may be shaped to define the two current paths, and an example of such an embodiment will be described in detail below.

Whatever the particular construction of the lever means, in preferred embodiments the read-mode heater is offset further from the axis of pivotal movement of the lever means than the write-mode heater. This feature provides a mechanical amplification mechanism in that the pivotal movement described by the read-mode heater is amplified as compared with the movement described by the read/write tip, allowing still further improvements in read-back sensitivity as compared with prior arrangements.

The decoupling means itself may take various forms depending, inter alia, on how the power supply means is operated in the two different modes. In a particularly simple system, the power supply means may be arranged to impose a potential of one polarity between the supply lines in the write mode and a potential of the opposite polarity between the supply lines in the read mode. In a read/write component for use in such a system, the write decoupling means may simply inhibit current flow to the write-mode heater in the direction of current flow resulting from application of the read-mode potential, and the read decoupling means may simply inhibit current flow to the read-mode heater in the direction of current flow resulting from application of the write-mode potential.

Embodiments of the invention described above may additionally employ a novel read-sensing arrangement. In particular, the support structure may extend at least partially around the lever means in a plane substantially parallel to the axis of pivotal movement, and the read-mode heater may extend over a surface of the support structure around the lever means to provide a gap between the read-mode heater and said surface, such that the thickness of the gap varies with pivotal movement of the lever means. With this arrangement, rather than using the storage medium as a heat sink for the thermal read-sensing system as in prior devices, the support structure can be used as the heat sink. In embodiments employing this arrangement, the read-mode heater can be operated at a higher temperature without risk of melting the polymer and hence possibly erasing data. In fabricating the component, the gap between the read-mode heater and support structure can be made small and can be accurately controlled, for example using a sacrificial film process. This arrangement thus allows still further improvement of the read-mode sensitivity.

In embodiments of the first aspect of the invention as described above, decoupling means is provided to inhibit current flow and thus inhibit heating at least of the write mode heater in the read mode of operation. A second aspect of the present invention provides a read/write component for a data storage device, the read/write component comprising:

lever means and a support structure, the lever means being connected to the support structure for substantially pivotal movement and providing at least one current path between a pair of electrical supply lines on the support structure;

a write-mode heater provided on the lever means in the or a said current path;

a read/write tip provided on the write-mode heater; and a read-mode sensor provided on the lever means in the or a said current path;

wherein the thermal properties of the write-mode heater and adjacent regions of the lever means, and of the read-mode sensor and adjacent regions of the lever means, are such that, by application of a first signal pulse via the supply lines in use, the write-mode heater is heatable to a writing temperature $T_W$ while the read-mode sensor remains at a temperature less than $T_W$, and by application of a second signal pulse, which is of smaller amplitude and longer duration than the first signal pulse, via the supply lines in use, the read-mode sensor is heatable to a reading temperature $T_R < T_W$ while the write-mode heater remains at a temperature less than $T_W$.

In embodiments of the second aspect of the invention, therefore, a read mode sensor is provided separately of the write mode heater as before, but here the decoupling mechanism is thermal rather than electrical. Specifically, in these embodiments the arrangement is such that the thermal properties of the write-mode heater, the read-mode sensor, and the adjacent regions of the lever means, enable: (a) the write-mode heater to be heated to $T_W$ by a first signal pulse while the read-mode sensor temperature stays below $T_W$; and (b) the read-mode sensor to be heated to $T_R$ by a second, lower but longer, signal pulse while the write-mode heater temperature stays below $T_W$. Thus, the write-mode heater is effectively thermally decoupled in the read mode to the extent that it does not heat to $T_W$ in response to the comparatively long, low-amplitude read-mode pulse. Similarly, the read-mode sensor is effectively thermally decoupled in the write mode to the extent that it does not heat to $T_W$ in response to the comparatively short, high-amplitude write-mode pulse. As with the electrically-decoupled embodiments described above, therefore, a read mode sensor is provided separately of the write mode heater but the component can still be addressed in both the write and read modes using only a single pair of supply lines. Corresponding advantages are therefore provided by embodiments employing this thermal decoupling mechanism.

It will be appreciated by those skilled in the art that various aspects of the design, such as the construction, arrangement, shape, size and material, of elements of the lever means can be selected appropriately to provide the required thermal properties. For example, the thermal capacitance of a given element is indicative of the amount of energy required to heat the element to a given temperature and depends on the material and volume of the element. Similarly, the thermal time constant of an element is dependent on the rate of heat loss from surfaces of the element, and the efficiency of adjacent elements in transporting heat, and is thus dependent on factors such as the size, dimensions, cross-section and material. By appropriate choice of various features, therefore, different thermal coupling strengths between the write-mode heater and surroundings, and between the read-mode heater and surroundings, can be achieved. In preferred embodiments, the write-mode heater is smaller than the read-mode sensor, and the regions of the lever means adjacent the write-mode heater provide for a relatively high rate of heat loss from the write-mode heater in use, while the regions of the lever means adjacent the read-mode sensor provide for a relatively low rate of heat loss from the read-mode sensor in use. For example, in the particularly preferred case where the lever means is formed substantially of conductive material shaped to define said at least one current path, the regions of the lever means adjacent the read-mode sensor preferably comprise constrictions to inhibit heat loss from the read-mode sensor in use.

The lever means may have various configurations, cantilever or otherwise, as in the electrically decoupled embodiments, though a particularly convenient cantilever configuration will be described further below. Moreover, embodiments of this aspect of the invention may employ the novel read-sensing arrangement discussed above which uses the support structure as a heat sink, and may take advantage of the mechanical amplification available by locating the read-mode sensor further from the pivot axis than the write heater. In some embodiments, the read-mode sensor itself may comprise a heater as before. In other embodiments, however, the read-mode sensor may simply comprise a thermal-resistive sensor which is sufficiently close to the write-mode heater that heat loss from the write-mode heater during application of the read-mode signal pulse in use causes heating of the read-mode sensor to the reading temperature $T_R$.

By exploiting the basic principle of the novel read-sensing arrangement described above, the efficient implementation of read/write components which use various read-sensing mechanisms becomes practicable. Thus, according to a third aspect of the present invention there is provided a read/write component for a data storage device, the read/write component comprising:

lever means and a support structure, the lever means being connected to the support structure for substantially pivotal movement and providing a first current path between a pair of electrical supply lines on the support structure, wherein the support structure extends at least partially around the lever means in a plane substantially parallel to the axis of said pivotal movement;

a write-mode heater provided on the lever means in the first current path;

a read/write tip provided on the write-mode heater;

a first proximity sensor element provided on a portion of the support structure around the lever means; and a second proximity sensor element provided on the lever means and disposed over the first proximity sensor element such that the distance between the first and second proximity sensor elements varies with pivotal movement of the lever means;

wherein at least one of the lever means and support structure provides a second current path for coupling of the supply lines via the first and second proximity sensor elements.

Examples of read/write components embodying this aspect of the invention will be described further below. It will be appreciated that embodiments of this aspect of the invention may employ decoupling means as described above, in particular to inhibit current flow at least to the write-mode heater in the read mode of operation, and preferably also to inhibit current flow to the read-sensing arrangement in the write mode where required. Moreover, various configurations of the lever means can be envisaged as before, though a particularly preferred arrangement will be described in detail below.

While the above focuses specifically on data storage applications, various features of the components described above, and most particularly the novel read sensing arrangement, can also provide significant advantages in atomic force microscopy applications. AFM technology is well known in the art and need not be described in detail here, but it is useful to consider the following basic description of the operating principles.

THE FIGURES

Preferred embodiments of the invention will now be described, by way of example, with reference to the accompanying drawings in which:

FIG. 4a is a schematic illustration of a first read/write component embodying the invention;

FIG. 4b shows the equivalent electrical circuit for the read/write component of FIG. 4a;

FIG. 5 is a schematic illustration of a second embodiment of a read/write component;

FIG. 6b shows the equivalent electrical circuit for the read/write component of FIG. 6a;

FIG. 7b shows the equivalent electrical circuit for the read/write component of FIG. 7a;

FIG. 10a is a schematic illustration of a sixth embodiment of a read/write component;

FIG. 10b shows the equivalent electrical circuit for the read/write component of FIG. 10b;

FIG. 10c illustrates read and write-mode signal pulses for driving the component of FIG. 10a.

DETAILED DESCRIPTION OF THE INVENTION

Figure 1A:
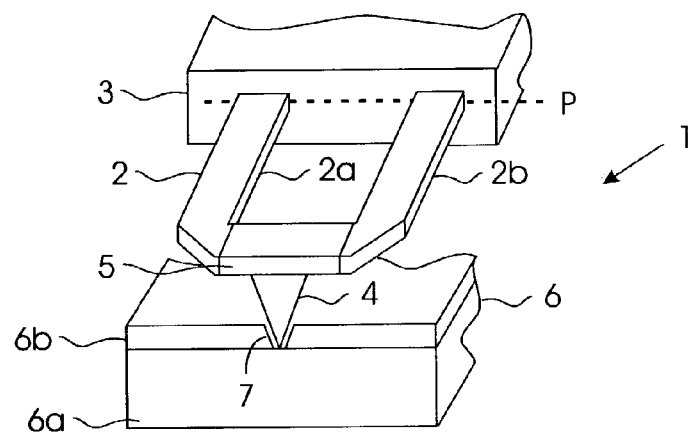
FIGS. 1a to 1c illustrate the construction and operation of a prior read/write component for a data storage device.
Figures 1B, 1C:
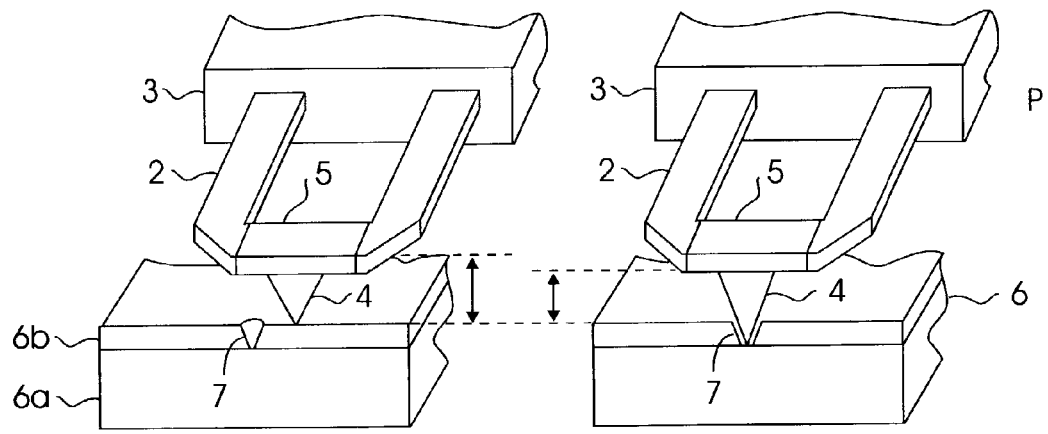

A read/write component 1 of the AFM-based data storage device is shown schematically in FIGS. 1a to 1c of the accompanying drawings. The component 1 comprises a generally U-shaped cantilever 2 which is connected to a support structure 3 (only partially shown in the figures). Flexing of the legs 2a, 2b of the cantilever 2 provides for substantially pivotal movement of the cantilever about a pivot axis P. The read/write tip 4 is provided on a heater 5 which forms a platform at the end of the cantilever 2. The highly-doped silicon cantilever legs 2a, 2b define a current path connecting the heater platform 5 between a pair of electrical supply lines (not shown) on the support structure 3. In operation, the read/write tip 4 is biased against the surface of a data storage medium indicated schematically at 6 and shown here in cross-section. Here, the storage medium comprises a silicon substrate 6a and a 40 nm-thick polymer surface layer 6b.

In the write mode, the heater platform 5 can be heated to a writing temperature $T_W$ by application of a write-mode potential across the supply lines. The consequent heating of the tip 4 results in heat transfer to the polymer surface layer 6a causing local melting of the polymer. This allows the tip 4 to penetrate the surface layer to form a pit, or bit indentation, 7 as shown in FIG. 1a. Such a pit represents a bit of value "1", a bit of value "0" being represented by the absence of a pit. The storage medium 6 can be moved relative to read/write component 1 allowing the tip to write data over an area of the surface, or "storage field", corresponding to the field of movement.

In the read mode, the heater platform 5 is used as a thermal sensor by exploiting its temperature-dependent resistance. A read-mode potential is applied across the supply lines to heat the heater to a reading temperature $T_R$ which is less than the writing temperature $T_W$ and not high enough to cause melting of the polymer. As the storage field is scanned by the tip 4, the pivotal position of the cantilever 2 at each bit position differs according to the presence or absence of a pit 7. In the absence of a pit, as shown in FIG. 1b, the distance between the heater platform 5 and storage medium 6 is greater than the corresponding distance when a pit is present, and the tip enters the pit, as shown in FIG. 1c. Heat transport across the air gap between the heater 5 and storage medium 6 is thus more efficient when a pit is present at a bit position, and since more heat is then lost to the storage medium, the temperature of the heater 5, and hence its resistance, will be reduced. Thus, as the storage field is scanned, the data bits are detected by monitoring changes in the temperature of the heater 5, in practice by monitoring changes in the voltage across a series resistor in one of the supply lines.

While the operation of a single read/write component 1 has been explained above, in practice an array of such components is employed as described in the article referenced earlier. One of the two supply lines for each component is a row supply line which is common to all components in the same row of the array, and the other supply line is a column supply line which is common to all components in the same column of the array. In this way, the number of supply lines is minimized and a simple x-y (row-column) addressing scheme is used to supply power to the read/write components to drive the heaters 5.

Thus, with the above apparatus, only a single pair of supply lines is required to address each component in both the write mode and the read mode, allowing use of a simple x-y addressed array structure. However, in the individual components, the heater platform design is necessarily a tradeoff between the needs for writing and the needs for reading, and this limits operating efficiency in both the write mode and the read mode.

According to a first aspect of the present invention there is provided a read/write component for a data storage device, the read/write component comprising:

lever means and a support structure, the lever means being connected to the support structure for substantially pivotal movement and providing first and second current paths between a pair of electrical supply lines on the support structure via which the lever means is connectable, in use, to power supply means operable in a write mode and a read mode;

a write-mode heater provided on the lever means in the first current path;

a read/write tip provided on the write-mode heater;

a read-mode heater provided on the lever means in the second current path; and decoupling means arranged to inhibit current flow to the write-mode heater via the first current path in use when the power supply means is operated in the read mode.

In embodiments of the present invention, therefore, separate write and read-mode heaters are provided on the lever means in respective current paths between the supply lines on the support structure, and decoupling means inhibits current flow via the current path to the write-mode heater when the component is operated in the read mode. The use of separate read and write heaters, together with the decoupling of the write heater in the read mode of operation, allows the design of the write and read heaters to be tailored more closely to the needs of the write and read-mode operations while still requiring only a single pair of supply lines to address the component in the two modes. For example, the write heater can be made small, with a low resistance, to provide a fast, low-voltage, low power writing element. In contrast, the read heater can be made large to increase the thermal sensitivity and signal-to-noise ratio in the read mode, while the decoupling means operates here to inhibit current flow to, and hence heating of, the write heater, thus preventing this heater from reaching a writing temperature. The efficiency of the component, for example in terms of writing speed, power consumption and reading sensitivity, can thus be significantly improved without requiring additional supply lines for the dual-mode operation, allowing convenient implementation of a simple x-y addressed array arrangement as discussed above.

In embodiments where the decoupling means serves only to inhibit current flow to the write heater in the read mode, then in the write mode some heating of the read heater will occur during heating of the write heater to $T_W$. While this energy loss may not be critical, in preferred embodiments the decoupling means is arranged additionally to inhibit current flow to the read-mode heater via the second current path in use when the power supply means is operated in the write mode. In such embodiments, the read and write heaters are effectively independently addressable, allowing the maximum performance benefits to be gained from read and write heater optimization.

Arrangements can be envisaged where the decoupling means comprises some form of supply-controlled switch for switching between the two current paths according to the operating mode. For simplicity however, in preferred embodiments the decoupling means comprises write decoupling means, which inhibits current flow to the write-mode heater when the power supply means is operated in the read mode, and read decoupling means which inhibits current flow to the read-mode heater when the power supply means is operated in the write mode. As discussed further below, the location of the decoupling means on the component depends on the particular design of the lever means.

The lever means may be configured as a cantilever, and while embodiments can be envisaged in which the current paths are provided as conductive tracks on the cantilever body, the cantilever is conveniently formed as a conductive structure which defines the current paths generally by virtue of its shape. In one example, the cantilever comprises two laterally disposed leg portions, connected at respective corresponding ends to the support structure, and first and second bridging portions each interconnecting the two leg portions. Here, the first bridging portion comprises the write-mode heater and the second bridging portion comprises the read-mode heater. In this example, the leg portions and the first bridging portion may themselves define the first current path, the second current path being similarly defined by the leg portions and the second bridging portion. Such an embodiment will be described in more detail below, and in this case the decoupling means is located on the cantilever. In another example, the cantilever comprises three laterally disposed leg portions, connected at respective corresponding ends to the support structure, a first bridging portion interconnecting the central leg portion to a first of the outer leg portions and a second bridging portion interconnecting the central leg portion to the second outer leg portion. Again, the first bridging portion comprises the write-mode heater and the second bridging portion comprises the read-mode heater. In this case, however, the first outer leg portion, the first bridging portion and the central leg portion define the first current path, and the second outer leg portion, the second bridging portion and the central leg portion define the second current path. With this construction, the decoupling means can be conveniently located on the support structure as will be demonstrated below.

In an alternative arrangement, rather than being configured as a cantilever as in the prior proposals, the lever means comprises an elongate lever body and two connection arms, extending outwardly from the lever body on either side thereof, connecting the lever body to the support structure and defining a pivot axis, offset from the ends of the lever body, about which the lever body pivots in use. In this "swing lever" arrangement, the write-mode heater and read-mode heater are disposed on opposite sides of the pivot axis at or near the ends of the lever body. Again, the lever body may be shaped to define the two current paths, and an example of such an embodiment will be described in detail below.

Whatever the particular construction of the lever means, in preferred embodiments the read-mode heater is offset further from the axis of pivotal movement of the lever means than the write-mode heater. This feature provides a mechanical amplification mechanism in that the pivotal movement described by the read-mode heater is amplified as compared with the movement described by the read/write tip, allowing still further improvements in read-back sensitivity as compared with prior arrangements.

The decoupling means itself may take various forms depending, inter alia, on how the power supply means is operated in the two different modes. In a particularly simple system, the power supply means may be arranged to impose a potential of one polarity between the supply lines in the write mode and a potential of the opposite polarity between the supply lines in the read mode. In a read/write component for use in such a system, the write decoupling means may simply inhibit current flow to the write-mode heater in the direction of current flow resulting from application of the read-mode potential, and the read decoupling means may simply inhibit current flow to the read-mode heater in the direction of current flow resulting from application of the write-mode potential.

Embodiments of the invention described above may additionally employ a novel read-sensing arrangement. In particular, the support structure may extend at least partially around the lever means in a plane substantially parallel to the axis of pivotal movement, and the read-mode heater may extend over a surface of the support structure around the lever means to provide a gap between the read-mode heater and said surface, such that the thickness of the gap varies with pivotal movement of the lever means. With this arrangement, rather than using the storage medium as a heat sink for the thermal read-sensing system as in prior devices, the support structure can be used as the heat sink. In embodiments employing this arrangement, the read-mode heater can be operated at a higher temperature without risk of melting the polymer and hence possibly erasing data. In fabricating the component, the gap between the read-mode heater and support structure can be made small and can be accurately controlled, for example using a sacrificial film process. This arrangement thus allows still further improvement of the read-mode sensitivity.

In embodiments of the first aspect of the invention as described above, decoupling means is provided to inhibit current flow and thus inhibit heating at least of the write mode heater in the read mode of operation. A second aspect of the present invention provides a read/write component for a data storage device, the read/write component comprising:

lever means and a support structure, the lever means being connected to the support structure for substantially pivotal movement and providing at least one current path between a pair of electrical supply lines on the support structure;

a write-mode heater provided on the lever means in the or a said current path;

a read/write tip provided on the write-mode heater; and a read-mode sensor provided on the lever means in the or a said current path;

wherein the thermal properties of the write-mode heater and adjacent regions of the lever means, and of the read-mode sensor and adjacent regions of the lever means, are such that, by application of a first signal pulse via the supply lines in use, the write-mode heater is heatable to a writing temperature $T_W$ while the read-mode sensor remains at a temperature less than $T_W$, and by application of a second signal pulse, which is of smaller amplitude and longer duration than the first signal pulse, via the supply lines in use, the read-mode sensor is heatable to a reading temperature $T_R<T_W$ while the write-mode heater remains at a temperature less than $T_W$.

In embodiments of the second aspect of the invention, therefore, a read mode sensor is provided separately of the write mode heater as before, but here the decoupling mechanism is thermal rather than electrical. Specifically, in these embodiments the arrangement is such that the thermal properties of the write-mode heater, the read-mode sensor, and the adjacent regions of the lever means, enable: (a) the write-mode heater to be heated to $T_W$ by a first signal pulse while the read-mode sensor temperature stays below $T_W$; and (b) the read-mode sensor to be heated to $T_R$ by a second, lower but longer, signal pulse while the write-mode heater temperature stays below $T_W$. Thus, the write-mode heater is effectively thermally decoupled in the read mode to the extent that it does not heat to $T_W$ in response to the comparatively long, low-amplitude read-mode pulse. Similarly, the read-mode sensor is effectively thermally decoupled in the write mode to the extent that it does not heat to $T_W$ in response to the comparatively short, high-amplitude write-mode pulse. As with the electrically-decoupled embodiments described above, therefore, a read mode sensor is provided separately of the write mode heater but the component can still be addressed in both the write and read modes using only a single pair of supply lines. Corresponding advantages are therefore provided by embodiments employing this thermal decoupling mechanism.

It will be appreciated by those skilled in the art that various aspects of the design, such as the construction, arrangement, shape, size and material, of elements of the lever means can be selected appropriately to provide the required thermal properties. For example, the thermal capacitance of a given element is indicative of the amount of energy required to heat the element to a given temperature and depends on the material and volume of the element. Similarly, the thermal time constant of an element is dependent on the rate of heat loss from surfaces of the element, and the efficiency of adjacent elements in transporting heat, and is thus dependent on factors such as the size, dimensions, cross-section and material. By appropriate choice of various features, therefore, different thermal coupling strengths between the write-mode heater and surroundings, and between the read-mode heater and surroundings, can be achieved.

In preferred embodiments, the write-mode heater is smaller than the read-mode sensor, and the regions of the lever means adjacent the write-mode heater provide for a relatively high rate of heat loss from the write-mode heater in use, while the regions of the lever means adjacent the read-mode sensor provide for a relatively low rate of heat loss from the read-mode sensor in use. For example, in the particularly preferred case where the lever means is formed substantially of conductive material shaped to define said at least one current path, the regions of the lever means adjacent the read-mode sensor preferably comprise constrictions to inhibit heat loss from the read-mode sensor in use.

The lever means may have various configurations, cantilever or otherwise, as in the electrically decoupled embodiments, though a particularly convenient cantilever configuration will be described further below. Moreover, embodiments of this aspect of the invention may employ the novel read-sensing arrangement discussed above which uses the support structure as a heat sink, and may take advantage of the mechanical amplification available by locating the read-mode sensor further from the pivot axis than the write heater. In some embodiments, the read-mode sensor itself may comprise a heater as before. In other embodiments, however, the read-mode sensor may simply comprise a thermal-resistive sensor which is sufficiently close to the write-mode heater that heat loss from the write-mode heater during application of the read-mode signal pulse in use causes heating of the read-mode sensor to the reading temperature $T_R$.

By exploiting the basic principle of the novel read-sensing arrangement described above, the efficient implementation of read/write components which use various read-sensing mechanisms becomes practicable. Thus, according to a third aspect of the present invention there is provided a read/write component for a data storage device, the read/write component comprising:

lever means and a support structure, the lever means being connected to the support structure for substantially pivotal movement and providing a first current path between a pair of electrical supply lines on the support structure, wherein the support structure extends at least partially around the lever means in a plane substantially parallel to the axis of said pivotal movement;

a write-mode heater provided on the lever means in the first current path;

a read/write tip provided on the write-mode heater;

a first proximity sensor element provided on a portion of the support structure around the lever means; and a second proximity sensor element provided on the lever means and disposed over the first proximity sensor element such that the distance between the first and second proximity sensor elements varies with pivotal movement of the lever means;

wherein at least one of the lever means and support structure provides a second current path for coupling of the supply lines via the first and second proximity sensor elements.

Examples of read/write components embodying this aspect of the invention will be described further below. It will be appreciated that embodiments of this aspect of the invention may employ decoupling means as described above, in particular to inhibit current flow at least to the write-mode heater in the read mode of operation, and preferably also to inhibit current flow to the read-sensing arrangement in the write mode where required. Moreover, various configurations of the lever means can be envisaged as before, though a particularly preferred arrangement will be described in detail below.

While the above focuses specifically on data storage applications, various features of the components described above, and most particularly the novel read sensing arrangement, can also provide significant advantages in atomic force microscopy applications. AFM technology is well known in the art and need not be described in detail here, but it is useful to consider the following basic description of the operating principles.

Figure 2:
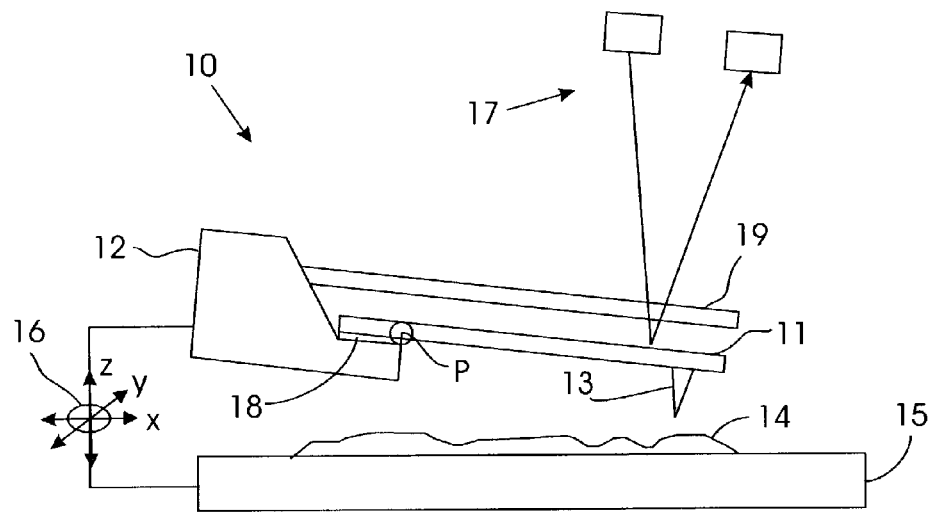
FIG. 2 is a schematic representation of an atomic force microscope illustrating the basic detection mechanisms used in prior systems.

FIG. 2 of the accompanying drawings is a schematic representation of an AFM, illustrating in the same diagram the three basic detection mechanisms employed in the art. The sensing apparatus 10 of the AFM comprises a microfabricated cantilever 11 connected to a support structure 12 for substantially pivotal movement about a pivot axis P, this movement being provided as before by flexing of the cantilever body. The sensing tip 13 is disposed at the end of the cantilever remote from the support structure 12. In operation, a sample 14 to be analyzed is placed on a sample support 15. A drive mechanism, indicated schematically at 16, effects relative movement of the sample support 15 and sensing apparatus 10 such that the sample is scanned by the tip 13. During scanning, interaction of atomic forces between the tip and sample surface effects pivotal movement of the cantilever 11, and the topography of the sample is revealed by detecting this movement. The three basic detection systems are indicated generally at 17, 18 and 19. (In practice, of course, only one of these detection systems is employed). The first system employs an optical mechanism to detect deflection of the cantilever as indicated schematically at 17 in the figure. The second system utilizes a piezoelectric element 18 which senses the stress caused by the pivotal deflection of the cantilever. The third system employs an in-line electrode 19, mounted above the cantilever 11. This serves as a proximity sensor for the cantilever 13, the distance between the cantilever and in-line electrode 19 varying with deflection of the cantilever.

Various problems are associated with the AFM systems described above. The in-line electrode arrangement 19 is difficult to fabricate, whereas provision of the optical sensing mechanism 17 results in a relatively complex arrangement. Where the piezoelectric mechanism 18 is employed, sensitivity is dependent on the stress induced by flexing of the cantilever and this stress increases with rigidity of the cantilever. A more rigid cantilever gives a higher sensitivity but higher tip-sample contact pressure is then required for the same deflection, resulting in increased wear on the tip and potential damage to the sample.

According to a fourth aspect of the present invention there is provided sensing apparatus for an atomic force microscope, the apparatus comprising:

lever means and a support structure, the lever means being connected to the support structure for substantially pivotal movement and the support structure extending at least partially around the lever means in a plane substantially parallel to the axis of said pivotal movement; and a sensing tip provided on the lever means such that interaction of atomic forces between the tip and a sample scanned thereby in use causes said pivotal movement of the lever means;

wherein part of the lever means extends over part of the support structure around the lever means such that the distance between said parts varies with said pivotal movement, whereby the topography of a sample scanned by the tip in use is indicated by variations in said distance.

In embodiments of this aspect of the invention, therefore, tip movement can be monitored simply by detecting the relative proximity of the particular parts of the lever means and support structure defined above. This provides for a simple yet highly efficient proximity sensing mechanism, obviating the drawbacks of the existing systems discussed above. Clearly, the variations in proximity of the aforementioned parts of the apparatus can be detected in various ways, and particular examples will be described below. Preferably, however, at least one of said parts provides a proximity sensor element for sensing such variations. Particularly preferred embodiments employ thermal proximity sensing similar to the data storage components described earlier. Here, said part of the lever means may comprise a heater, the lever means providing a current path for connecting the heater to a power supply via the support structure in use, whereby said part of the support structure serves as a heat sink such that the temperature of the heater varies with variations in said distance. With the support structure serving as a heat sink, the heater can be operated at a relatively high temperature without risk of damaging the sample which may be a biological sample for example. Whatever proximity sensing system is employed, to enhance sensitivity the aforementioned part of the lever means is preferably located at or near an end of the lever means remote from the axis of pivotal movement. As with the read/write components described earlier, the lever means may have various configurations, though the swing lever configuration with mechanical amplification is particularly advantageous here. As described further below, various other features discussed above in relation to read/write components can be employed to advantage in embodiments of the sensing apparatus.

Another aspect of the invention provides an atomic force microscope incorporating sensing apparatus as described above. Respective further aspects of the invention provide apparatus comprising an array of read/write components according to the first, second and third aspects of the invention, and data storage devices incorporating such arrays.

Figure 3:
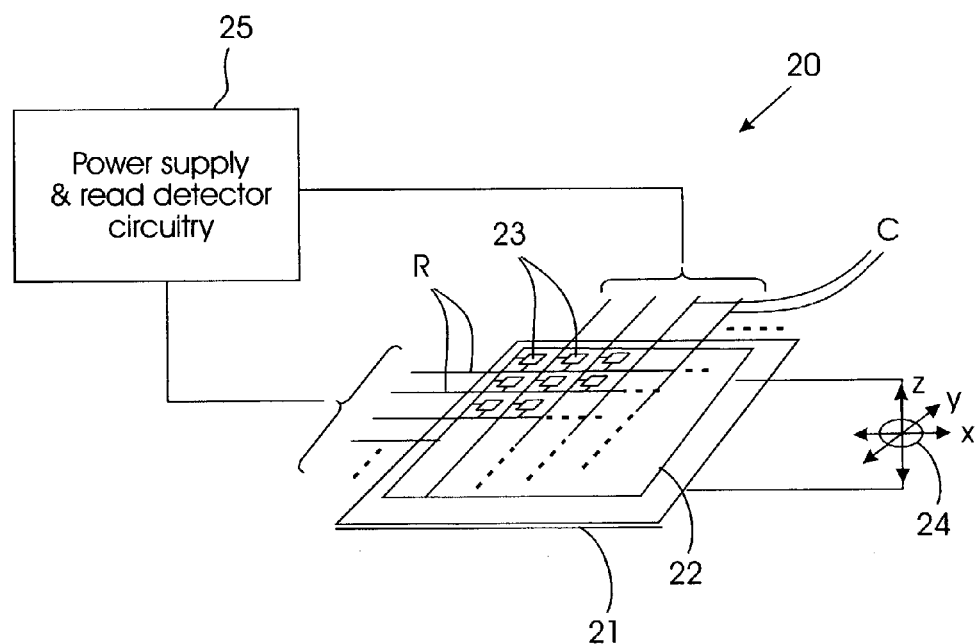
FIG. 3 is a schematic representation of a data storage device in which read/write components embodying the invention can be employed.

Referring first to FIG. 3, the data storage device 20 includes a data storage medium 21 and read/write apparatus in the form of an array 22 of read/write components 23. (Various embodiments for use as read/write components 23 will be described in detail below. It is to be appreciated, however, that these components may include additional circuitry, such as amplifiers etc., where required, though such additional circuitry is not central to embodiments of the invention and is therefore omitted from the descriptions hereinafter). Each read/write component 23 is connected to two supply lines, a row supply line R and a column supply line C, as indicated schematically in the figure. All components 23 in the same row of the array share the same row supply line R. Similarly, all components in the same column of the array share the same column supply line C. Drive means, indicated schematically at 24, enables the relative movement of the array and storage medium, whereby the array can be accurately located in its operating position against the storage medium and, during operation, each component 23 can scan its individual storage field as described earlier.

The row and column lines R, C of array 22 are connected to power supply and read detection circuitry indicated generally at 25. Circuitry 25 operates to supply power to the components of the array 22, the individual components 23 being addressed by their row and column lines in known manner via row and column multiplexers (not shown separately) of circuitry 25. Each component 23 can be addressed in both a write mode and a read mode, the power supply circuitry supplying a write mode signal via the supply lines in the write mode, and a read mode signal via the supply lines in the read mode. The read detector circuitry of block 25 operates in the read mode to detect the bit values indicated by the read-sensing mechanisms of components 23. In general, this read detection can be performed in various ways as will be apparent to those skilled in the art. In the particular embodiments described hereinafter, however, the read detection is conveniently performed as in prior systems by measuring the voltage across series resistors connected in the column lines C of array 22.

FIG. 4a illustrates a first embodiment of a read/write component 30 which may be employed in an array of similar components as the array 22 in the data storage device of FIG. 3. The component 30 comprises lever means, in the form of a cantilever 31, connected to a support structure 32 only part of which is shown in the figure. (An integral support structure is in fact provided for all components in the array, the entire array being fabricated as an integrated circuit using semiconductor processing techniques of generally known type, so that the main body of the chip provides the support structure 32 for all cantilevers 31 in the array). The cantilever 31 is formed by two laterally disposed cantilever legs 33a, 33b interconnected by first and second bridging portions 34 and 35 respectively. A write-mode heater 36 is centrally disposed on the first, relatively small-section bridging portion 34 and forms a platform for the read/write tip 37. A pair of diodes 38a and 38b are integrated in bridging portion 34, one on either side of the heater 36. These diodes 38a, 38b constitute write decoupling means as explained below. The second bridging portion 35 is formed by a read-mode heater 39 which is considerably larger than the write-mode heater 36 and connects the ends of the cantilever legs 33a, 33b remote from the connection to the support structure. A further pair of diodes 40a and 40b are integrated in the sections of the cantilever legs between the first and second bridging portions, one on either side of the read-mode heater 39. These diodes 40a, 40b constitute read decoupling means as explained below.

By virtue of flexibility of the legs 33a, 33b of the cantilever, the cantilever can describe substantially pivotal movement about a pivot axis P at the connection to the support structure. (It will of course be appreciated that, since this movement is provided by flexing of the cantilever legs, the motion is not strictly pivotal movement about a pivot axis as with a rigid body mounted on a pivot. The effect is substantially the same, however, and the terms "pivotal movement" and "pivot axis" as used herein should be construed accordingly).

During fabrication of the array, the various elements of the cantilever structure are formed by known semiconductor processing techniques; The cantilever legs 33a, 33b here are formed of highly-doped silicon to provide conductive connections between the write and read heaters 36, 39 and the row and column supply lines R and C on the support structure 32. It can be seen that, by virtue of its shape, the cantilever 31 defines two current paths between the supply lines R, C. The cantilever legs 33a, 33b and the first bridging portion 34 provide the first current path, containing the diodes 38a, 38b and the write heater 36. The legs 33a, 33b and the second bridging portion 35 provide the second current path, containing the diodes 40*a*, 40*b* and the read heater 39. FIG. 4*b* shows the equivalent electrical circuit for the component 30. It can be seen from this figure that the diode pair 38*a*, 38*b* are connected so as to inhibit current flow in one direction between the supply lines, whereas the diode pair 40*a*, 40*b* are connected so as to inhibit current flow in the opposite direction.

In operation of the component 30 in an array 22 of the storage device of FIG. 3, the power supply circuit 25 operates to apply a potential of one polarity between the supply lines R, C in the write mode, and a potential of the other polarity between the supply lines in the read mode. Thus, in the write mode, current flows in the first current path to write heater 36 via diodes 38*a* and 38*b*, but flow of current to the read heater 39 in the second current path is inhibited by diodes 40*a* and 40*b*. Similarly, in the read mode, current flows in the second current path to read heater 39 via diodes 40*a* and 40*b*, but flow of current to the write heater 36 in the first current path is inhibited by diodes 38*a* and 38*b*. In the write mode therefore, the small, low resistance write heater 36 in the narrow bridging portion 34 can be heated very quickly to the writing temperature $T_W$, without unnecessary expenditure of energy on the read heater 39. In the read mode, the relatively large read heater 36 provides high sensitivity for the thermal sensing operation and, during heating to the reading temperature $T_R$, the write heater 36 is protected from heating by the decoupling action of the diodes 38*a*, 38*b*. The tip 37 and polymer surface layer of the storage medium are therefore kept cool during reading, reducing wear on the polymer. Overall, therefore, component 30 provides a highly efficient read/write component, with a high write-speed, low power consumption and high read-sensitivity, which can be addressed in both modes via the single pair of row and column supply lines.

Clearly, only one diode of each pair 38*a*, 38*b* and 40*a*, 40*b* need be provided in this embodiment to achieve the electrical decoupling effect. However, in this preferred arrangement, the two diodes of each pair are provided to balance the cantilever about its longitudinal axis perpendicular to the pivot axis P. Note also that, of the two heaters 36 and 39, the read heater 39 is provided on the bridging portion of cantilever 31 which is furthest from the pivot axis P. While the opposite arrangement is possible, this arrangement ensures that the pivotal movement of the write platform due to read-mode scanning by the tip 37 is enhanced in the movement of the read platform. FIG. 5 illustrates an example of an embodiment in which this effect is exploited further. In the component 45 of this embodiment, the various elements of the cantilever correspond to those of FIG. 4*a*, but the ratio of distance $d_1$ between the read heater 46 and pivot axis to the distance $d_2$ between the write heater 47 and pivot axis has been increased, thereby increasing the amplification of the pivotal motion of the tip as indicated by the arrows in the figure. This mechanical amplification mechanism provides still further improvement in read-sensitivity of the component. Clearly, the amplification factor $(d_1/d_2)$ achievable for a practical tip-to-pivot axis distance will depend on various aspects of the component design such as the operating speed, flexibility and resonant frequency of the cantilever. However, an amplification factor of at least 2 can be readily achieved, and in preferred embodiments the amplification factor can be from about 5 up to about 10 depending on design constraints.

Figure 6A:
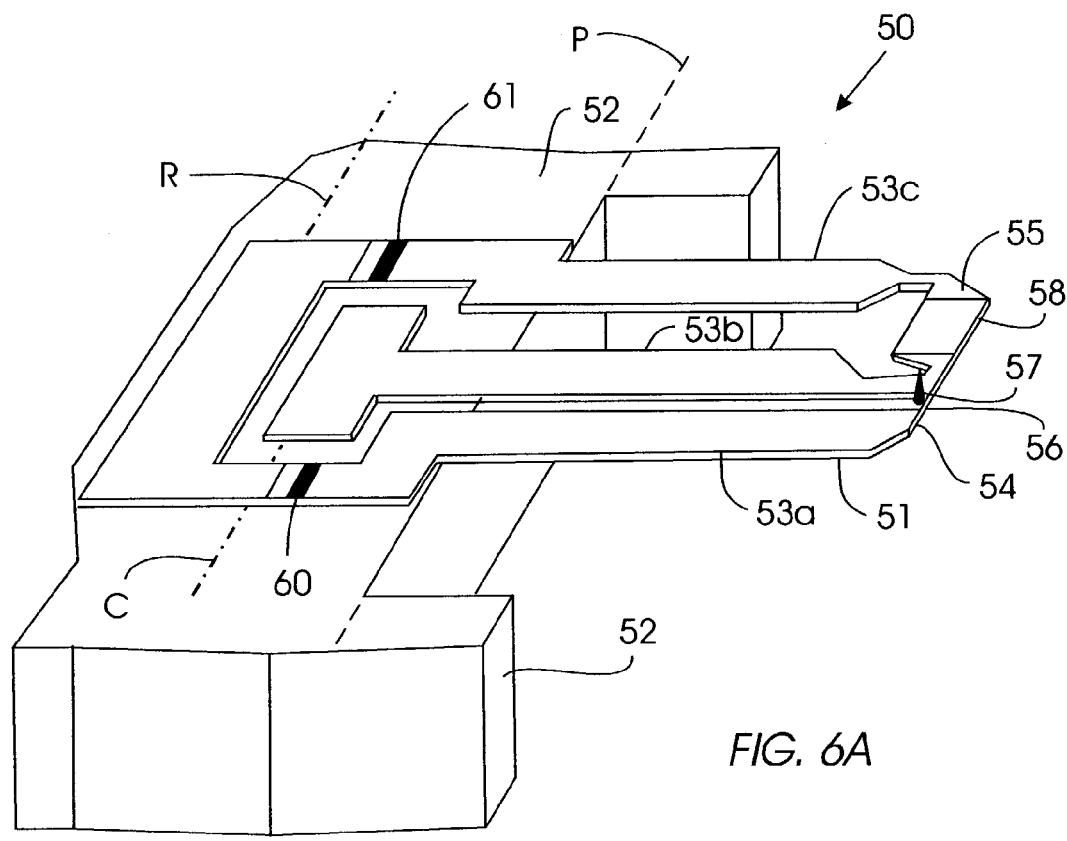
FIG. 6a is a schematic illustration of a third embodiment of a read/write component.
Figure 6B:
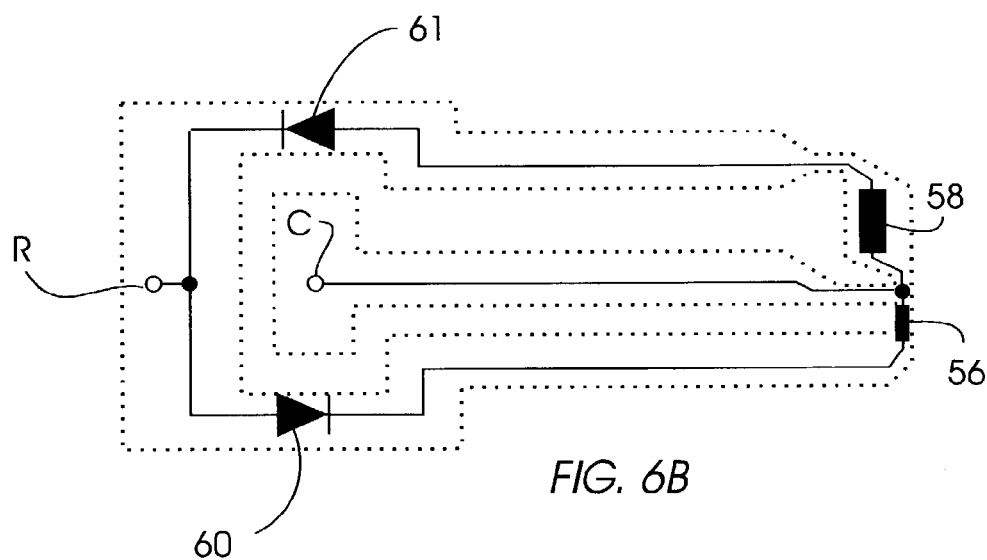

FIG. 6*a* illustrates a third embodiment of a read/write component for use in the data storage device of FIG. 3. The component 50 of this embodiment again comprises a cantilever 51 connected to a support structure 52 for substantially pivotal movement about a pivot axis P. Here, however, the cantilever has three laterally disposed legs 53*a*, 53*b* and 53*c*. A first bridging portion 54 interconnects the outer leg 53*a* and the central leg 53*b*. A second bridging portion 55 interconnects the outer leg 53*c* and the central leg 53*b*. The first bridging portion is formed by a write-mode heater 56 which forms a platform for read/write tip 57. A read-mode heater 58 is provided in the second bridging portion 55. As before, the conductive cantilever legs 53*a*, 53*b*, 53*c* provide connections to row and column supply lines R and C on the support structure 52 as indicated in the figure. It can be seen that the cantilever again defines two current paths between the supply lines R, C. The first current path is defined by the outer leg 53*a*, the first bridging portion 54, containing write heater 56, and the central leg 53*b*. The second current path is defined by the outer leg 53*c*, the second bridging portion 55, containing read heater 58, and the central leg 53*b*. Decoupling means are again provided, but here the decoupling means is located on the support structure. Specifically, as shown in the figure, a write-decoupling diode 60 is connected between the row supply line R and the outer leg 53*a*, and a read decoupling diode 61 is connected between the row supply line R and the outer leg 53*c*. The equivalent electrical circuit for this embodiment is illustrated in FIG. 6*b*, from which it can be seen that the diodes 60 and 61 are connected to inhibit current flow in opposite directions between the supply lines R, C. Thus, in operation of this embodiment in the data storage device of FIG. 3, the power supply circuit again applies potentials of opposite polarities between the supply lines in the write and read modes. In the write mode, current flows in the first current path to write heater 56 via diode 60, but flow of current to the read heater 58 in the second current path is inhibited by diode 61. In the read mode, current flows in the second current path to read heater 58 via diode 61, but flow of current to the write heater 56 in the first current path is inhibited by diode 60. Corresponding operational advantages therefore apply to this embodiment as to the component 30 of FIG. 4*a*. Here, however, only a single diode is provided in each current path. Moreover, with this cantilever design the decoupling means can be conveniently located on the support structure rather than the cantilever itself.

While diodes are employed as the electrical decoupling mechanism in the particular embodiments illustrated in the drawings, it will be appreciated by those skilled in the art that the electrical decoupling system can be implemented in various other ways, for example using transistors or other elements arranged to provide the desired decoupling effect. Moreover, while opposite-polarity voltages are employed in the examples here for the write and read modes of operation, clearly other systems can be envisaged, for example using voltages of different levels and circuit elements arranged to inhibit current flow above, below, between or outside certain threshold levels. Where the decoupling mechanism is more complex than the simple diode arrangements illustrated herein, the ability to locate the decoupling means on the support structure can be especially advantageous. The cantilever design of FIG. 6*a* therefore provides particular flexibility in implementation of the decoupling system.

Figure 7A:
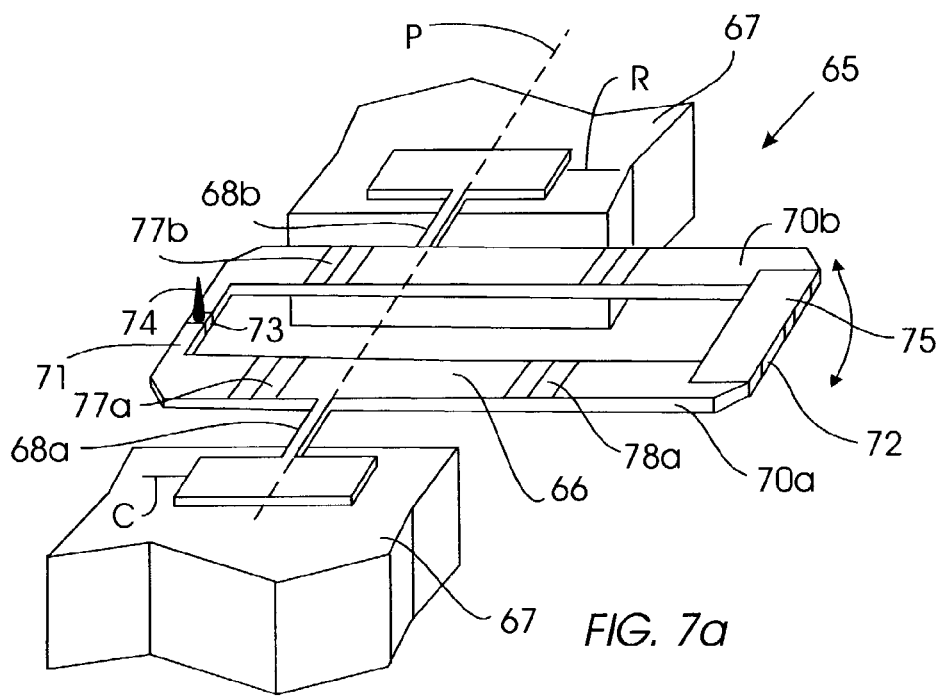
FIG. 7a is a schematic illustration of a fourth embodiment of a read/write component.

FIG. 7*a* illustrates a fourth embodiment of a read/write component where the lever means has a "swing lever" configuration. Specifically, in the component 65 of this embodiment, the lever means has an elongate lever body 66 which is connected to the support structure 67 (again only partially shown in the figure) by two connection arms 68*a* and 68*b*. Torsion in these connection arms provides for substantially pivotal movement of the lever body 66 about a pivot axis P as indicated by the arrows in the figure. The lever body 66 comprises two laterally disposed leg portions 70a and 70b interconnected at one end by a first bridging portion 71 and at the other end by a second bridging portion 72. A small write-mode heater 73 is located in the first, relatively narrow, bridging portion 71, and provides a platform for the read/write tip 74. The second bridging portion 72 is formed by a relatively large read-mode heater 75. The conductive lever body and connection arms define two current paths between the row and column lines R and C on the support structure 67. The first current path is provided by the connection arms 68a, 68b, the sections of the legs 70a, 70b between the connection arms and first bridging portion 71, and the first bridging portion containing the write heater 73. The second current path is provided by the connection arms 68a, 68b, the sections of the legs 70a, 70b between the connection arms and second bridging portion 72, and the second bridging portion containing the read heater 75. Decoupling means in the form of write decoupling diodes 77a, 77b and read decoupling diodes 78a, 78b are provided on the lever body 66. The write decoupling diodes 77a, 77b are disposed, symmetrically about the longitudinal axis of the lever body, between the connection arms and write heater 73, and the read decoupling diodes 78a, 78b are similarly disposed between the connection arms and read heater 75.

Figure 7B:
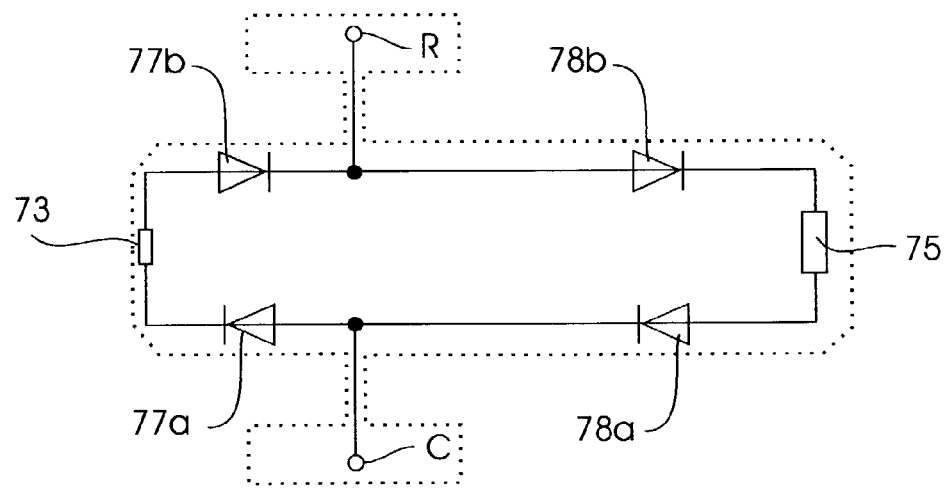

FIG. 7b shows the equivalent electrical circuit for the component 65 of this embodiment. It can seen that here, as before, the write decoupling diodes 77a, 77b are connected to inhibit current flow between the supply lines R, C in the opposite direction to the read decoupling diodes 78a, 78b. Thus, in operation in the data storage device of FIG. 3, the read decoupling diodes 78a, 78b inhibit current flow to read heater 75 when a write-mode potential is applied between the supply lines to drive the write heater via the first current path. Similarly, write decoupling diodes 77a, 77b inhibit current flow to write heater 73 when an opposite-polarity, read mode potential is applied to drive the read heater 75 via the second current path. Corresponding operational advantages therefore apply to this embodiment as to the cantilever arrangements described above. In addition, torsion of the small-section connection arms 68a, 68b is highly effective for providing pivotal movement of the lever body without significant flexing of the cantilever legs 70a, 70b. Note also that the mechanical amplification mechanism discussed above is easily employed in this swing lever configuration, the read heater 75 being offset further from the pivot axis P than the write mode heater with tip 74.

Figure 8:
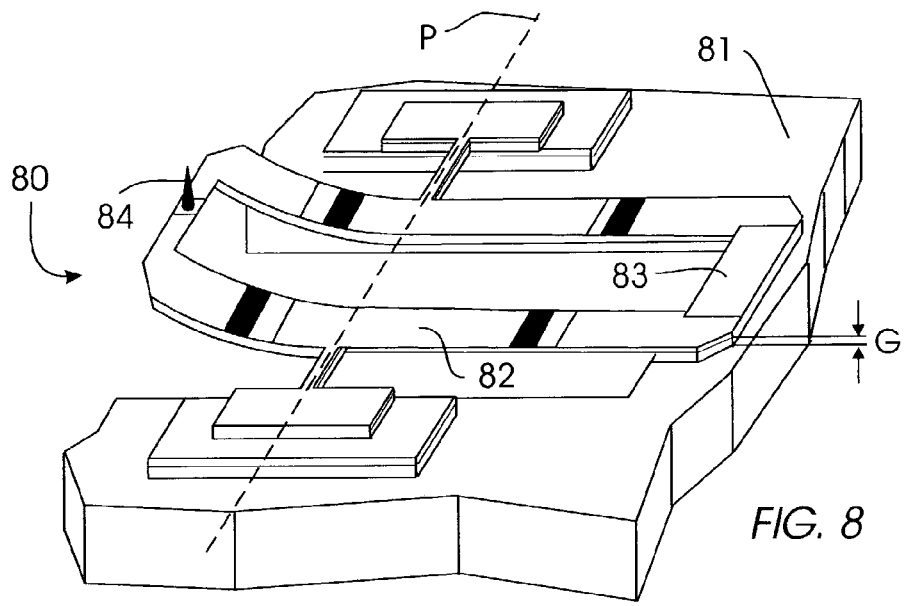
FIG. 8 is a schematic illustration of a fifth embodiment of a read/write component.

In the embodiments described above, read-sensing can be performed as in prior systems by using the storage medium 21 as the heat sink for the read heater. However, FIG. 8 illustrates an example of a read/write component in which the lever means and support structure are arranged for thermal read-sensing to be performed using the support structure as the heat sink. The component 80 of this embodiment is generally similar to the swing-lever embodiment of FIG. 7a and only the key differences will be described here. Firstly, as illustrated in the figure, the support structure 81 in this embodiment extends around the lever body 82 in a plane substantially parallel to the pivot axis P and the general extent of the lever body. (Of course, the surface of the support structure need not itself be planar, the plane referred to here simply indicating the general orientation in which the support structure extends around the lever body). Secondly, part of the lever body 82, specifically the read-mode heater 83, extends over part of the support structure 81 to provide a gap G between the heater and the facing surface of the support structure. It can be seen from the figure that the thickness of the gap G will vary with pivotal movement of the lever body. In this embodiment, therefore, the support structure provided by the body of the array chip can be used as the heat sink for the thermal read-sensing system. This allows still further improvement in read-sensitivity since the gap G can be made very small and can be accurately controlled during component fabrication, for example by a sacrificial film process, and the read-mode heater can be operated at a higher temperature without risk of erasing data. A further notable difference here is that the lever body 82 is shaped so that, relative to the surface of the support structure facing the read heater 83, the write heater is offset further in the direction of the tip 84 than the read heater. In this particular embodiment, this is achieved as shown in the figure by the upwardly-bent section of the lever body on the tip side of the connection arms. This feature serves to increase the read heater-to-storage medium spacing in use, so reducing the effect of variations in this spacing on the results of the read-sensing operation, and further enhancing read-sensitivity. (A similar effect could be achieved in other ways in different arrangements. For example, in a one-dimensional array, or a single-tip system such as the AFM sensing apparatus described below, the read heater-to-storage medium spacing (or AFM equivalent) could be increased simply by tilting the apparatus relative to the medium so that the read heater is further from the medium than the tip).

While use of the read-sensing arrangement of FIG. 8 is particularly convenient in components with the swing lever configuration, it will be appreciated that similar arrangements could be employed in cantilever embodiments such as those discussed above by appropriate configuration of the support structure. In such cases, the write-heater platform could be raised relative to the read heater if desired to increase the read heater-to-storage medium spacing as described above. Also, for example, in the embodiment of FIG. 6a the read heater could be offset further from the pivot axis than the tip platform to facilitate use of the support structure as the heat sink and exploit the mechanical amplification mechanism discussed earlier. In any case, where such a read-sensing arrangement is employed, it will be apparent that the support structure need not extend entirely around the lever means, but just sufficiently to enable the structure to serve as the heat sink for the read heater.

Figure 9A:
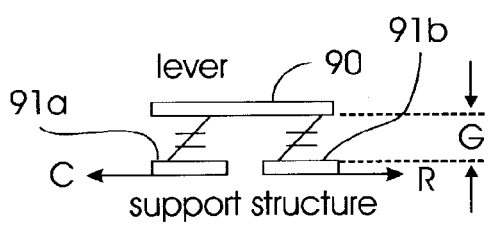
FIGS. 9a to 9e illustrate various proximity sensor arrangements for use in embodiments of the invention.
Figure 9B:
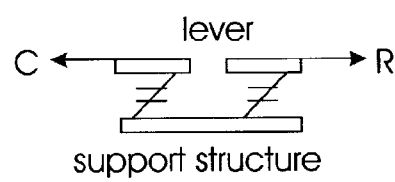
Figure 9C:
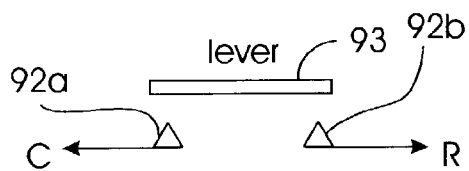
Figure 9D:
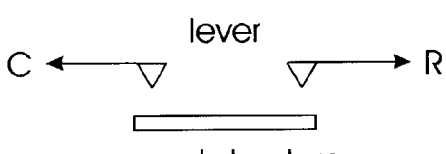
Figure 9E:
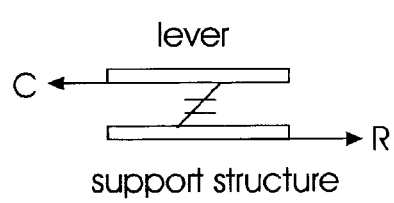

With the read-sensing arrangement just described, proximity sensing is performed between the read heater and support structure using the read heater as a thermal proximity sensor. However, with the same basic arrangement, read-sensing systems using other proximity sensing mechanisms become practicable. In general, a first proximity sensor element can be disposed on the support structure, and a second proximity sensor element can be provided on the lever means, this second element being disposed over the element on the support structure such that the distance between the two varies with the pivotal movement. FIGS. 9a to 9d illustrate examples of alternative proximity sensing mechanisms where electrodes are employed as the proximity sensor elements. In FIG. 9a, an electrode 90 is provided in place of the read heater on the lever means, and a pair of electrodes 91a and 91b are provided on the support structure. Each of the electrodes 91a, 91b is connected to one of the supply lines R, C on the support structure. Air in the gap G thus serves as a dielectric between the lever and support structure electrodes to provide a variable capacitance as the thickness of the gap G varies with pivotal movement of the lever. Variations in this capacitance can thus be detected to provide the read-mode output. Note that a current path to the electrode 90 via the lever body is not required here, the current path being provided on the support structure for coupling the row and column lines, via the capacitor electrodes, in the read mode. The opposite arrangement is illustrated in FIG. 9b. Here, the pair of electrodes, and connections to the row and column lines, are provided on the lever and the single electrode is located on the support structure. FIG. 9c shows another arrangement in which a pair of contact electrodes 92a, 92b are provided on the support structure, and a bridging contact 93 is provide on the lever. This arrangement effectively serves as a switch to provide a digital read-out: when the electrodes are in contact, the switch is ON and current flows between the supply lines; when the electrodes are not in contact, the switch is OFF and no current flows between the supply lines. Here, again, the current path between the supply lines is provided on the support structure for the read-mode operation. FIG. 9d shows the equivalent arrangement where the two contact electrodes, and hence the current path between the supply lines, are provided on the lever. Clearly, however, an arrangement such as that shown in FIG. 9e can be envisaged, where an electrode on the lever is connected to one of the supply lines via the lever body, and an electrode on the support structure is connected to the other supply line via the support structure. In this case therefore, the current path for read mode operation is provided in part on the lever and in part on the support structure. Of course, the electrodes in FIG. 9e could also be contact electrodes for operation as a switch.

Depending on the particular read-sensing mechanism employed, electrical decoupling may or may not be necessary. In preferred embodiments, however, at least write decoupling means is provided to inhibit current flow to the write-mode heater in the read mode of operation as described earlier. Provision of read decoupling means may be less important, for example in the switch arrangement. Usually, however, it will be preferable also to provide read decoupling means to inhibit current flow via the current path to the proximity sensor elements in the write mode of operation. Such read decoupling means may be located on the lever or support structure as appropriate, depending on the location of the current path for the read mode of operation as described above. In general, even in the thermal read-sensing embodiments described earlier, only write decoupling means may be provided in some cases, though preferred embodiments will provide both write and read mode decoupling.

The embodiments illustrated thus far employ an electrical decoupling mechanism. An example of an embodiment which uses a thermal decoupling mechanism will now be described with reference to FIGS. 10a to 10c. The component 100 of this embodiment again comprises a cantilever 101 connected to a support structure 102 (only partially shown) for substantially pivotal movement about a pivot axis P. The cantilever has two laterally disposed leg portions 103a, 103b interconnected at the ends remote from the pivot axis by a bridging portion 104. In this example, therefore, the conductive cantilever 101 defines a single current path between the supply lines R, C on the support structure, this current path being provided by the cantilever legs 103a, 103b and the bridging portion 104. Here, both the write-mode heater 105, with tip 106, and the read-mode heater 107 are located on bridging portion 104. Thus, both the write-mode heater and the read-mode heater lie in the same current path as indicated in the equivalent electrical circuit of FIG. 10b.

When the component 100 is employed in the data storage device of FIG. 3, the power supply circuit 25 is operated to apply different signal pulses via the supply lines R, C in the write and read modes of operation as shown in FIG. 10c. In the write mode, a relatively short, high amplitude pulse $S_W$ is applied. In contrast, in the read mode a relatively long, low amplitude pulse $S_R$ is applied. Although the read and write-mode heaters lie in the same current path, the cantilever configuration is such that the thermal properties of the heaters and adjacent regions of the cantilever provide a dual-mode thermal decoupling effect. Specifically, application of the short, high-amplitude write mode pulse $S_W$ results in heating of the write heater 105 to the writing temperature $T_W$, but the read heater 107 heats to a lesser extent during this process and thus remains at a temperature less than $T_W$. Similarly, application of the long, low-amplitude read mode pulse $S_R$ results in heating of the read heater 107 to its reading temperature $T_R$, but heating of the write heater is less efficient in this mode, so that the write heater remains at a temperature less than $T_W$. The features of the cantilever design giving the thermal properties which provide this decoupling effect can be seen in FIG. 10a. The write heater 105 is very small by comparison with the read heater 107, but there is good thermal contact between the write heater and the adjacent regions 108, 109 of the cantilever. In contrast, there is relatively poor thermal contact between the large read heater 107 and the adjacent regions 109, 110 of the cantilever, these regions 109, 110 constituting constrictions as compared with the adjoining sides of the read heater. In operation, therefore, regions 109, 110 provide a comparatively low rate of heat loss from the read heater, whereas regions 108, 109 provide a comparatively high rate of heat loss from the write heater. Thus, write heater 105 heats quickly but loses heat at a relatively high rate to the cantilever, whereas read heater 107 heats slowly but loses heat at a relatively low rate to the cantilever. The high amplitude of the write mode pulse $S_W$ is therefore required to heat the write heater to $T_W$, but this pulse is too short to cause significant heating of the read heater. In contrast, the read mode pulse $S_R$ is sufficiently long to allow the read heater to heat to $T_R$, but the amplitude is too low to cause significant heating of the write heater. Hence, the thermal decoupling mechanism operates in both modes, allowing the component to be addressed in both modes via the single pair of supply lines R, C with only a single current path, containing both heaters, on the cantilever.

It will of course be appreciated that, while simple rectangular pulses are shown in FIG. 10c to illustrate the operating principle, this is by no means essential. Various signal pulses which serve to supply, respectively, a relatively high power over a short period and a lower power over a longer period can be employed. Thus, the pulse "amplitude" referred to herein may be a mean or RMS amplitude for example, rather than a constant dc level as in the simple example of FIG. 10c. Further, as will be apparent to those skilled in the art, various other cantilever designs can be envisaged here to provide the required thermal properties. In addition, in some embodiments, instead of using a read heater which actively heats to the read temperature $T_R$ in the read mode of operation, the read sensor may simply be a thermal-resistive element which is heated primarily by heat loss from the write mode heater in the read mode. Moreover, various advantageous features of the electrically decoupled embodiments described above can be equally employed to advantage in thermally decoupled embodiments. For example, the mechanical amplification mechanism may be employed in some designs by locating the read sensor further from the pivot axis than the read/write tip. As a further example, read-sensing may be performed in some embodiments using the chip body as the heat sink as described above.

Figure 11:
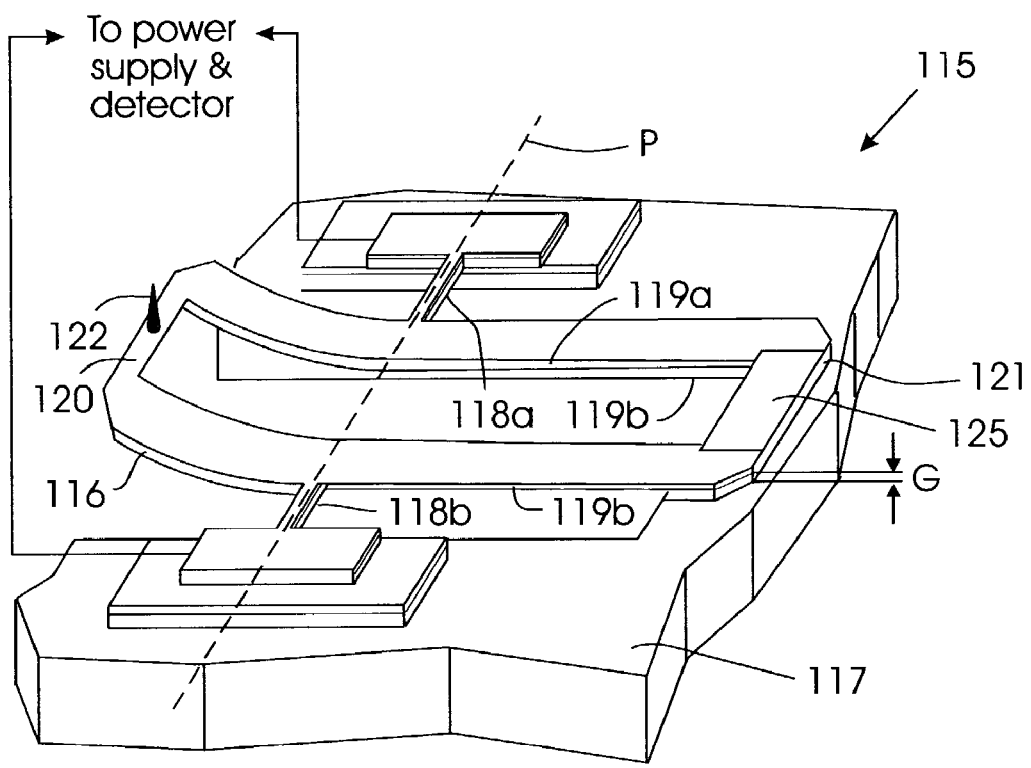
FIG. 11 is a schematic representation of AFM sensing apparatus embodying the invention.

While the above has focused on data storage applications, the arrangements whereby part of the lever extends over part of the support structure around the lever can also be employed to advantage in AFM applications. The swing lever configuration is particularly preferred here, and FIG. 11 illustrates an example of sensing apparatus employing this arrangement for use in the AFM of FIG. 2. The sensing apparatus 115 here is generally similar to the read/write component of FIG. 8, comprising a lever body 116 connected to a support structure 117 via torsional connection arms 118a, 118b for pivotal movement about a pivot axis P. Cantilever body 116 has two laterally disposed leg portions 119a, 119b interconnected at their ends by first and second bridging portions 120 and 121 respectively. A sensing tip 122 is centrally disposed on the first bridging portion 120, though no tip heater is required for AFM operation, pivotal movement of the lever body being induced, in use, through interaction of atomic forces between the tip and sample surface. The support structure 117 extends around the lever body as in FIG. 8, and the second bridging portion 121 of the lever extends over part of the surrounding support structure to provide a small gap G which varies with pivotal movement of the lever. Thus, the AFM readout can be obtained here by detecting variations in the gap G during scanning of the sample by tip 122. Various sensor mechanisms can be employed to sense variations in the gap G, for example involving proximity sensor elements on one or both of the overlapping parts of the lever body and support structure as illustrated in FIGS. 9a to 9e. In this particularly preferred embodiment, however, thermal proximity sensing is performed as above by providing a heater 125 in the second bridging portion 121 of the lever body. The connection arms 118a, 118b, and the sections of the legs 119a, 119b between the connection arms and second bridging portion are therefore conductive, defining a current path for connection of the heater 125, via the support structure, to power supply and detection circuitry as indicated in the figure. Thus, during scanning by the sensing tip 122, the support structure serves as a heat sink for heater 125, the temperature, and hence resistance of the heater varying with variations in the gap G. The detector circuitry can monitor these variations as before, for example by detecting the voltage across a series resistor in the circuit to heater 125.

Since no heating of sensing tip 122 is required in this application, the sections of the legs 119a, 119b on the tip side of the lever body are formed to be highly resistive, thus providing means to inhibit current flow between the connection arms via the first bridging portion 120 during operation of heater 125. (Of course, the sensing tip could be otherwise isolated from the heater current, for example by forming all or part of the tip side of the lever body in oxide to prevent conduction, or decoupling diodes could be employed as above). The different properties of the various parts of the lever body are provided, as before, by appropriate doping of the semiconductor material during fabrication. The upwardly bent section of the lever body on the tip side, and the increased sensor-to-pivot axis distance here, provide the advantages explained earlier in relation to the data storage embodiments. Overall, therefore, this design provides a simple yet efficient and highly sensitive AFM sensor apparatus.

It will of course be appreciated that, while particularly preferred embodiments have been described in detail above, many changes and modifications can be made to these embodiments without departing from the scope of the invention.

The invention claimed is:

1. A read/write component for a data storage device, the read/write component comprising:
    a lever means is configured as a cantilever and comprises two laterally disposed leg portions, connected at respective corresponding ends to the support structure, and first and second bridging portions each interconnecting the two leg portions;
    the lever means configured as the cantilever and a support structure, the lever means being connected to the support structure for substantially pivotal movement and providing first and second current paths between a pair of electrical supply lines on the support structure via which the lever means is connectable, in use, to power supply means operable in a write mode and a read mode;
    a write-mode heater provided on the lever means in the first current path;
    a read/write tip provided on the write-mode heater;
    a read-mode heater provided on the lever means in the second current path; and
    decoupling means arranged to inhibit current flow to the write-mode heater via the first current path in use when the power supply means is operated in the read mode;
    the first bridging portion comprises the write-mode heater and the second bridging portion comprises the read-mode heater;
    the leg portions and the first bridging portion define the first current path, and the leg portions and the second bridging portion define the second current path; and
    the decoupling means is located on the lever means.

2. A read/write component as claimed in claim 1, wherein the write decoupling means is provided in the first current path on the first bridging portion, and the read decoupling means is provided in the second current path beyond the first bridging portion.

3. A read/write component as claimed in claim 1 wherein:
    the lever configured as a cantilever comprises three laterally disposed leg portions connected at respective corresponding ends to the support structure, a first bridging portion interconnecting the central leg portion to a first of the outer leg portions and a second bridging portion interconnecting the central leg portion to the second outer leg portion;
    the first bridging portion comprises the write-mode heater and the second bridging portion comprises the read-mode heater;
    the first outer leg portion, the first bridging portion and the central leg portion define the first current path;
    the second outer leg portion, the second bridging portion and the central leg portion define the second current path; and
    the decoupling means is located on the support structure.

4. A read/write component as claimed in claim 3, wherein the write decoupling means is connected between a said supply line and the first outer leg portion, and the read decoupling means is connected between that supply line and the second outer leg portion.

5. A read/write component as claimed in claim 1 wherein the lever means formed as a cantilever comprises an elongate lever body and two connection arms, extending outwardly from the lever body on either side thereof, connecting the lever body to the support structure and defining a pivot axis, offset from the ends of the lever body, about which the lever body pivots in use, and wherein the write-mode heater and read-mode heater are disposed on opposite sides of the pivot axis at or near the ends of the lever body.

6. A read/write component as claimed in claim 5 wherein the read-mode heater is offset further from the pivot axis than the write mode heater.

7. A read/write component as claimed in claim 5 wherein:
the lever body formed as a cantilever comprises two laterally disposed leg portions, a first bridging portion interconnecting the leg portions at or near one end of the lever body, and a second bridging portion interconnecting the leg portions at or near the other end of the lever body;
the first bridging portion comprises the write-mode heater and the second bridging portion comprises the read-mode heater;
the first current path is defined by the connection arms, the sections of the leg portions between the connection arms and first bridging portion, and the first bridging portion;
the second current path is defined by the connection arms, the sections of the leg portions between the connection arms and second bridging portion, and the second bridging portion; and
the decoupling means is provided on the lever body.

8. A read/write component as claimed in claim 7 wherein the write decoupling means is provided in the first current path between the connection arms and the write-mode heater, and the read decoupling means is provided in the second current path between the connection arms and the read-mode heater.

9. A read/write component as claimed in claim 8 for use with power supply means which is arranged to apply a potential of one polarity between the supply lines in the write mode and a potential of the opposite polarity between the supply lines in the read mode, wherein:
the write decoupling means is operative to inhibit current flow to the write-mode heater in the direction of current flow resulting from application of the read-mode potential, and the read decoupling means is operative to inhibit current flow to the read-mode heater in the direction of current flow resulting from application of the write-mode potential.

10. A read/write component as claimed in claim 9 wherein each of the write and read decoupling means comprises at least one diode.

11. A read/write component as claimed in claim 10, wherein each of the write and read decoupling means comprises a pair of diodes located so as to balance the lever means about a longitudinal axis thereof perpendicular to the axis of pivotal movement.

12. A read/write component as claimed claim 1 wherein the support structure extends at least partially around the lever means in a plane substantially parallel to the axis of pivotal movement thereof, and wherein the read-mode heater extends over a surface of the support structure around the lever means to provide a gap between the read-mode heater and said surface, such that the thickness of the gap varies with pivotal movement of the lever means.

13. A read/write component as claimed in claim 12 wherein the lever means is shaped such that the write-mode heater is offset further than the read-mode heater, in the direction of the read/write tip, from the plane of said surface.

14. A read/write component for a data storage device, the read/write component comprising:
lever means and a support structure, the lever means being connected to the support structure for substantially pivotal movement and providing at least one current path between a pair of electrical supply lines on the support structure;
a write-mode heater provided on the lever means in the or a said current path;
a read/write tip provided on the write-mode heater; and
a read-mode sensor provided on the lever means in the or a said current path;
wherein the thermal properties of the write-mode heater and adjacent regions of the lever means, and of the read-mode sensor and adjacent regions of the lever means, are such that, by application of a first signal pulse ($S_W$) via the supply lines in use, the write-mode heater is heatable to a writing temperature $T_W$ while the read-mode sensor remains at a temperature less than $T_W$, and by application of a second signal pulse ($S_R$), which is of smaller amplitude and longer duration than the first signal pulse ($S_W$), via the supply lines in use, the read-mode sensor is heatable to a reading temperature $T_R < T_W$ while the write-mode heater remains at a temperature less than $T_W$; wherein the lever means is configured as a cantilever comprising two laterally disposed leg portions, connected at respective corresponding ends to the support structure, and a bridging portion interconnecting the leg portions, the leg portions and the bridging portion defining a single said current path, and wherein each of the write-mode heater and read-mode sensor are provided on or near the bridging portion.

15. A read/write component as claimed in claim 14 wherein the support structure extends at least partially around the lever means in a plane substantially parallel to the axis of pivotal movement thereof, and wherein the read-mode sensor extends over a surface of the support structure around the lever means to provide a gap between the read-mode sensor and said surface, such that the thickness of the gap varies with pivotal movement of the lever means.

16. A read/write component as claimed in claim 15 wherein the lever means is shaped such that the write-mode heater is offset further than the read-mode sensor, in the direction of the read/write tip, from the plane of said surface.

17. A read/write component for a data storage device, the read/write component comprising:
lever means and a support structure, the lever means being connected to the support structure for substantially pivotal movement and providing a first current path between a pair of electrical supply lines on the support structure, wherein the support structure extends at least partially around the lever means in a plane substantially parallel to the axis of said pivotal movement;
a write-mode heater provided on the lever means in the first current path;
a read/write tip provided on the write-mode heater;
a first proximity sensor element provided on a portion of the support structure around the lever means; and
a second proximity sensor element provided on the lever means and disposed over the first proximity sensor element such that the distance between the first and second proximity sensor elements varies with pivotal movement of the lever means;
wherein at least one of the lever means and support structure provides a second current path for coupling of the supply lines via the first and second proximity sensor elements.

18. A read/write component as claimed in claim 17 wherein one of the first and second proximity sensor elements comprises a pair of contact electrodes each connected to a respective one of said supply lines via the second current path, and the other of the first and second proximity sensor elements comprises a bridging contact, and wherein the lever means is pivotable between a position in which the bridging contact connects the pair of contact electrodes and a position in which the bridging contact is disconnected from the contact electrodes.

19. A read/write component as claimed in claim 18 wherein the second proximity sensor element comprises said pair of electrodes whereby the second current path is provided by the lever means.

20. A read/write component as claimed in claim 18 for use with power supply means which is operable in a write mode to apply a write-mode potential across the supply lines, and in a read mode to apply a read-mode potential across the supply lines, wherein the component includes decoupling means) arranged to inhibit current flow to the write-mode heater via the first current path in use when the power supply means is operated in the read mode.

21. A read/write component as claimed in claim 20 wherein the decoupling means is arranged additionally to inhibit current flow via the second current path in use when the power supply means is operated in the write mode.

22. A read/write component as claimed in claim 17 wherein one of the first and second proximity sensor elements comprises a pair of electrodes each connected to a respective one of said supply lines via the second current path, and the other of the first and second proximity sensor elements comprises a facing electrode arranged opposite the pair of electrodes to provide a gap therebetween, wherein the thickness of the gap varies with pivotal movement of the lever means.

23. A read/write component as claimed in claim 17 wherein the lever means comprises an elongate lever body and two connection arms, extending outwardly from the lever body on either side thereof, which connect the lever body to the support structure (67, 81) and define the axis about which the lever body pivots in use, wherein said axis is offset from the ends of the lever body, and wherein the write-mode heater and the second proximity sensor element (90, 93) are disposed on opposite sides of the axis at or near the ends of the lever body.

24. A read/write component as claimed in claim 23 wherein the second proximity sensor element is offset further from said axis than the write-mode heater.

25. A read/write component as claimed in claim 23 wherein:
the lever body comprises two laterally disposed leg portions, a first bridging portion interconnecting the leg portions at or near one end of the lever body, and a second bridging portion interconnecting the leg portions at or near the other end of the lever body;
the first bridging portion comprises the write-mode heater and the second bridging portion comprises the second proximity sensor element; and
the first current path is defined by the connection arms, the sections of the leg portions between the connection arms and first bridging portion, and the first bridging portion.

26. Read/write apparatus for a data storage device, the apparatus comprising an array of read/write components as claimed in claim 17, one supply line of each component being a row supply line which is common to all components in the same row of the array, and the other supply line of each component being a column supply line which is common to all components in the same column of the array.

27. A data storage device comprising:
a data storage medium;
read/write apparatus as claimed in claim 26, the apparatus being positionable relative to a surface of the data storage medium such that the read/write tip of each component in the array is biased against the surface; and
power supply means which is operable in a write mode and a read mode to apply a potential across the supply lines of each component;
wherein said surface of the data storage medium is such that, in use, heat transfer from the write-mode heater on application of a write-mode potential across the supply lines of a said component causes local melting of the surface allowing penetration of the read/write tip to form a pit.

28. Sensing apparatus for an atomic force microscope, the apparatus comprising:
lever means and a support structure, the lever means being connected to the support structure for substantially pivotal movement and the support structure extending at least partially around the lever means in a plane substantially parallel to the axis of said pivotal movement; and
a sensing tip provided on the lever means such that interaction of atomic forces between the tip and a sample scanned thereby in use causes said pivotal movement of the lever means;
wherein part of the lever means extends over part of the support structure around the lever means such that the distance between said parts varies with said pivotal movement, whereby the topography of a sample scanned by the tip in use is indicated by variations in said distance: and
wherein said part of the support structure comprises a first proximity sensor element and said part of the lever means comprises a second proximity sensor element and wherein at least one of the lever means and support structure provides a current path for coupling terminals of a power supply via the first and second proximity sensor elements in use.

29. Apparatus as claimed in claim 28 wherein one of the first and second proximity sensor elements comprises a pair of electrodes each connectable via said current path to a respective one of said terminals in use, and the other of the first and second proximity sensor elements comprises a facing electrode arranged opposite the pair of electrodes to provide a gap therebetween, whereby the thickness of the gap varies with the pivotal movement of the lever means.

30. Apparatus as claimed in claim 29 wherein the second proximity sensor element comprises said pair of electrodes whereby the current path is provided by the lever means.

31. Sensing apparatus for an atomic force microscope, the apparatus comprising:
lever means and a support structure, the lever means being connected to the support structure for substantially pivotal movement and the support structure extending at least partially around the lever means in a plane substantially parallel to the axis of said pivotal movement; and
a sensing tip provided on the lever means such that interaction of atomic forces between the tip and a sample scanned thereby in use causes said pivotal movement of the lever means;
wherein part of the lever means extends over part of the support structure around the lever means such that the distance between said parts varies with said pivotal movement, whereby the topography of a sample scanned by the tip in use is indicated by variations in said distance; and wherein the lever means comprises an elongate lever body and two connection arms, extending outwardly from the lever body on either side thereof, which connect the lever body to the support structure and define the axis about which the lever body pivots in use, wherein said axis is offset from the ends of the lever body, and wherein the sensing tip and said part of the lever means are disposed on opposite sides of the axis at or near the ends of the lever body.

32. Apparatus as claimed in claim 31 wherein said part of the lever means is offset further from said axis than the sensing tip.

33. Apparatus as claimed in claim 31 wherein:

the lever body comprises two laterally disposed leg portions, a first bridging portion interconnecting the leg portions at or near one end of the lever body, and a second bridging portion interconnecting the leg portions at or near the other end of the lever body;

the sensing tip is provided on the first bridging portion; and the second bridging portion comprises said part of the lever means.

34. Apparatus as claimed in claim 33, wherein said current path is defined by the connection arms, the sections of the leg portions between the connection arms and second bridging portion, and the second bridging portion.

35. Apparatus as claimed in claim 34 including means for inhibiting flow of current between the connection arms via the first bridging portion.

* * * * *